United States Patent [19]

Shamie

[11] Patent Number: 4,725,071
[45] Date of Patent: Feb. 16, 1988

[54] TANDEM STROLLER

[76] Inventor: Louis Shamie, Delta Enterprise Corp., 972 Dean St., Brooklyn, N.Y. 11238

[21] Appl. No.: 20,592

[22] Filed: Mar. 2, 1987

[51] Int. Cl.⁴ .............................................. B62B 7/08
[52] U.S. Cl. .................... 280/643; 280/648; 280/658; 280/47.4; 297/243; 297/354
[58] Field of Search ............... 280/642, 643, 647, 648, 280/650, 658, 47.36, 47.38, 47.39, 47.4, 47.41; 297/243, 354

[56] References Cited

U.S. PATENT DOCUMENTS

| | | | |
|---|---|---|---|
| 1,842,159 | 1/1932 | Fleishman et al. | 280/47.4 X |
| 2,783,053 | 2/1957 | Sheldrick et al. | 280/47.4 X |
| 2,872,203 | 2/1959 | Hedstrom | 280/47.4 X |
| 3,235,279 | 2/1966 | Smith et al. | 280/648 |
| 3,248,125 | 4/1966 | Gill | 280/47.41 X |
| 3,330,575 | 7/1967 | Boudreau | 280/648 |
| 4,435,012 | 3/1984 | Kassai | 280/648 X |

*Primary Examiner*—John J. Love
*Assistant Examiner*—Michael Mar
*Attorney, Agent, or Firm*—Peter C. Michalos

[57] ABSTRACT

A foldable Tandem Stroller includes a main back which can be folded down to form a bed for a single child. A secondary back can be brought to an upright position exposing a seat portion and foot holds for the main back which is then in its lowered position. The main back includes an upright portion which can support the back, and a seat portion, which can support the bottom of a child sitting in the rear of the stroller. The same stroller can thus be used as a Tandem Stroller for two children or as a sleeping stroller or carriage for a single child.

7 Claims, 3 Drawing Figures

TANDEM STROLLER

FIELD AND BACKGROUND OF THE INVENTION

The present invention relates in general to strollers, and in particular to a new and useful Tandem Stroller which is foldable and which is only slightly larger than a stroller meant for a single child.

Tandem Strollers are known wherein one child sits behind the other on a elongated chassis. Such strollers are generally much larger and more cumbersome than a stroller meant for a single child.

SUMMARY OF THE INVENTION

The present invention is drawn to a foldable Tandem Stroller which has an upright back and seat which can be used for a single child, the back being lowerable to make room for a second child to be seated behind the first. A secondary back is provided which moves independantly of the main back. The secondary back can remain in an upright position to support the back of the child in front. The main back assembly also includes an upright back portion which is used to support the back of the child in the rear of the stroller.

The foldable Tandem Stroller of the present invention can also be used as a bed for a single child. To this end, the secondary back can be lowered onto the main back assembly to form a sleeping platform.

Another feature of the invention is that both the front and the rear wheels are pivotally mounted to the chassis of the stroller, with each of the wheels or wheel sets being individually lockable for forward and reverse movement, or releasable for steering movement. In this way the stroller can be used as a carriage by unlocking the rear wheel and locking the front wheels. Also to this end the handles of the strollers are pivotally mounted from a rear position on the stroller to a forward position on the stroller.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

The Tandem Stroller of the present invention is quite similar in its folding frame to the inventor's previous invention titled FOLDABLE BABY CARRIAGE WITH DOUBLE LOCK shown and described in U.S. Pat. No. 4,632,421 issued Dec. 30, 1986, which is incorporated here by reference.

U.S. Pat. No. 4,632,421 includes additional explanatory subject matter for the folding frame and its locking mechanism.

Figure 1:
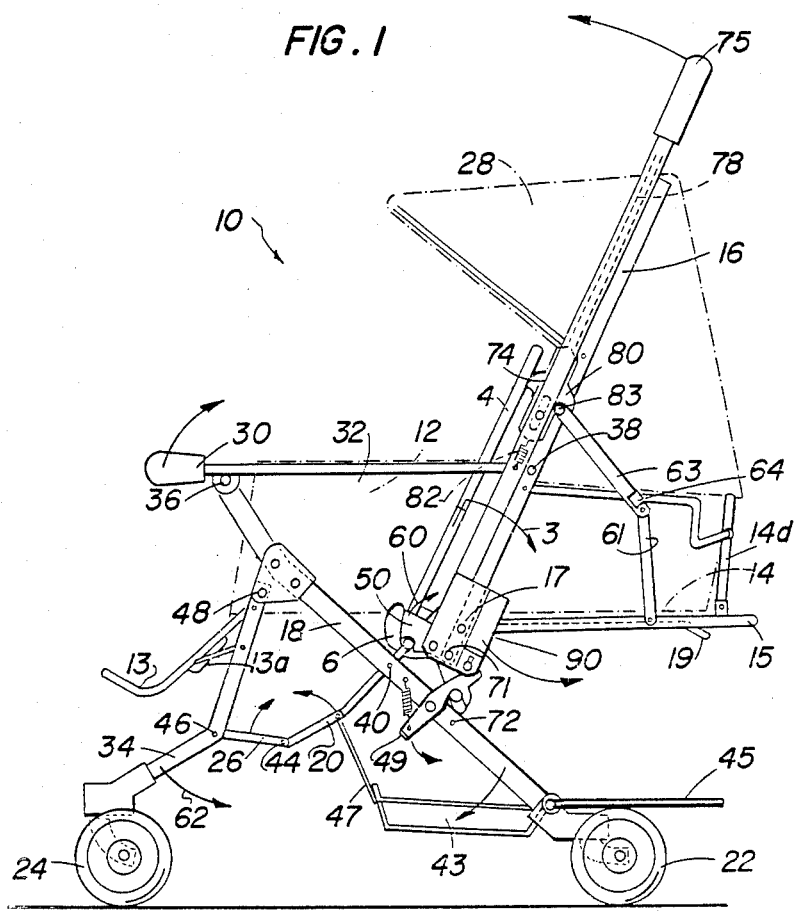
FIG. 1 is a side elevational view of a foldable Tandem Stroller in accordance with the present invention.
Figure 3:
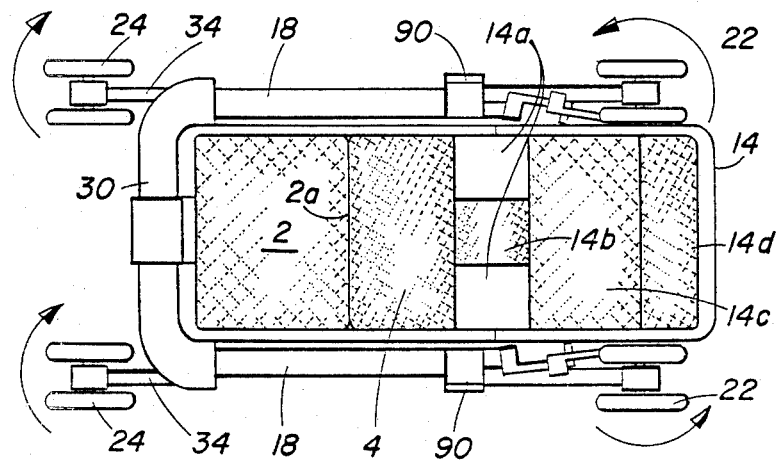
FIG. 3 is a partial top plan view of the stroller of FIG. 1 showing a Tandem seating arrangement with the secondary back shown in an upright position to reveal the rear seat.

Referring to the drawings in particular, a Tandem Stroller having foldable frame of the type utilized in the invention is shown in FIG. 1. The frame 10 which is foldable supports a front seat 2 shown in phantom line having a main back 14 (in reclined position) supported by a back member 15 that is pivotally connected at 17 to a first frame member 16 and a seat with sides 12 supported by an arm member 32 of the stroller frame 10. Front seat 2 has a rear edge 2a (FIG. 3). Main back 14 is pivotally mounted to the frame adjacent to the rear edge 2a for movement between an upright position (FIG. 1) and a substantially horizontal position (FIG. 3). A second frame member 18 on one side of frame 10 (other side also having one) is pivotally mounted to the arm member 32 at pivot point 36. Frame member 16 and arm member 32 are both U-shaped so that they have one leg on each side of the stroller frame. The lower end of each second frame member 18 rotatably receives an axle of a pair of steerable and lockable rear wheels 22.

The two legs of first frame member 16 are pivotally connected to an opposite end of each leg of arm member 32 at pivot point 38.

A cross member 20, 26 is pivotally mounted at pivot points 40 and 42 between first and second members 16 and 18. The cross member is itself foldable at pivot point 44 and formed of a cross link 20 and a connecting link 26.

The stroller frame 10 has a front frame member 35 which is pivotally mounted (in the direction of arrow 62) at 48 to the second frame member 18 and pivotally mounted at 46 to link 26. The frame includes two front frame members 34, one on each side of the frame, each of which pivotally and rotatably carries one or more steerable and lockable wheels 24.

The U-shaped first frame member 16 carries at its top a removable canopy 28 and the U-shaped arm member 32 carries at its top a removable canopy 28 and the U-shaped arm member 32 carries at its front a padded cross rail 30.

Figure 2:
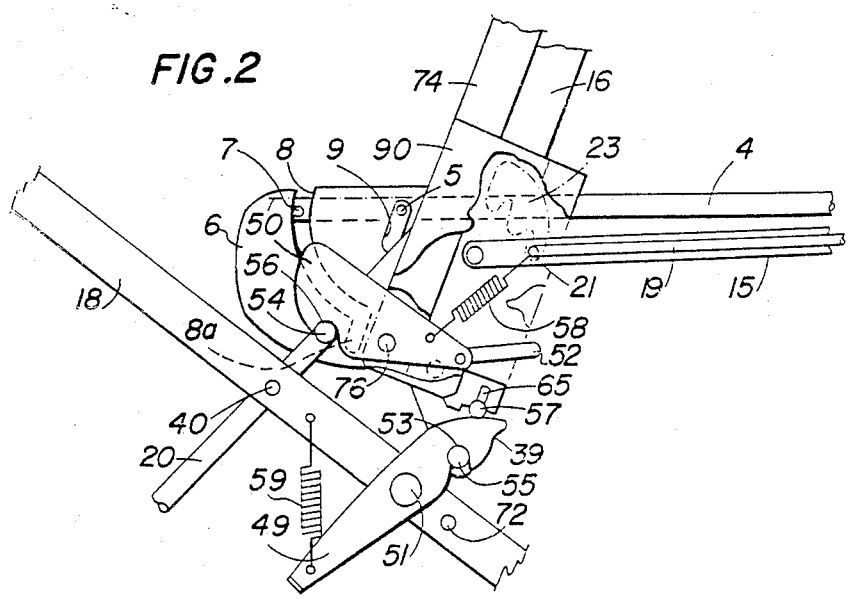
FIG. 2 is a partial view, on an enlarged scale, of the stroller shown in FIG. 1, in the latch and lock area, with parts of a plastic bearing block used in the carriage cut away.

A shown in FIGS. 1 and 2, a first latch 49 is pivotally mounted at 51 to a second frame member 18. Latch 49 has a hook 53 that engages a pin 55 connected through a plastic bearing block 90 to the lower end of first frame member 16.

Also pivotally mounted to the lower end of first frame member 16 is a second latch 50 having an actuator bar 52 which extends across the width of frame 10. Two latches 50 are provided, one for each leg of frame member 16, and bar 52 is connected to both of these latches.

Latch 50 includes a recess or hook 56 shown in greater detail in FIG. 2, which hooks latch engagement means in the form of pin 54 on cross link 20 to hold the frame in its open or unfolded position shown in FIG. 1. Latch 49 also independently hooks the frame in its unfolded position by engaging pin 55.

A spring 58 is connected between latch 50 and a rod 19 to hold hook 56 into engagement with pin 54. Rod 19 is slidably mounted on back member 15. Rod 19 has a pin 21 that engages one of three steps in a groove 23 in block 90, to set the inclination position of back 14.

Spring 59 connected between latch 49 and member 18 holds recess 53 on pin 55. To fold frame 10, latch 49 is first pivoted away from pin 55 into an unlocking locking position (not shown). The latch is held in this unlocked position by holding means in the form of rivet 57 and recess 39 on latch 49.

When latch 50 is then rotated in the direction of arrow 60, (FIG. 1) the stroller frame can be moved into its closed or folded position.

To accomplish folding, first frame member 16 is rotated counterclockwise with respect to pivot point 38. Second frame member 18 rotates clockwise and the cross and connecting links 20 and 26 rotate with respect to pivot point 44 toward each other. In the folded or closed position of stroller frame 10, members 16, 18 and 34 lie substantially parallel and adjacent each other to form a very compact configuration.

The holding means for first latch 49 comprises rivet 57 which is movable, substantially in a vertical direction, in a slot 65 provided in a tab-like projection of plastic bearing block 90.

A further pin 72 may be provided on frame member 18 for limiting the rotation of latch 49 after it has disengaged from its holding means. This is to ensure that latch 49 is in a correct position when the carriage is unfolded to again engage pin 55.

Returning to FIGS. 1 and 2, block 90 also pivotally carries a handle bar 74 which is pivotally mounted to block 90 on a pivot bar 76. Pivot bar 76 extends across the width of the stroller and also pivotally carries latch 50. A pair of holding plates 6 are connected to pivot bar 76. Handle bar 74 carries, at its upper end, a handle 75. Handle bar 74 also carries a locking rod 78 which is slidably mounted to handle bar 74. Locking rod 78 carries a double hook member 80 which is biased by spring 82 into engagement with a pin 83 fixed to first frame member 16. By lifting rod 78 against the bias of spring 82, handle bar 74 can be swung forward counterclockwise. In this position, double hook member 80 engages the pin 36 that is fixed to frame member 18. This converts the stroller configuration into a baby carriage configuration. To further facilitate this converstion the rear wheels 22 which are usually locked for straight rolling, may be unlocked and the front wheels 24 that are usually steering wheels, may be locked. Each wheel set 22,24 is individually lockable.

First frame member 16 is fixed to bearing block 90 by pivot pin 17 and a lower connectin pin 71, pivot pin 17 also acts as a pivot for back member 15.

Holding plates 6 are spaced apart and fixed on bar 76. Each of the holding plates are identical mirror images of each other. Each holding plate includes an arcuate groove 8 which ends at its base with a radial portion 8a and elongated slot 9 is positioned above and extends parallel to radial portion 8a.

The inventive stroller includes a secondary back 4 which is mounted for movement from an upright position shown in FIG. 1 to a substantially horizontal position shown in FIG. 2, on the holding plates 6. For this purpose, secondary back 4 has lower outwardly projecting pins 5 which are seated in the slots 9 and outwardly projecting pins 7 which are seated in the groove 8. The secondary back 4 includes a metal frame which is shown in the figures and a paded cover with a rigid board therein forming a back to the front passenger of the stroller. To bring the secondary back from its lower position shown in FIG. 2 to its upright position shown in FIG. 1, the frame is first pivoted upwardly in a counterclockwise direction about the pins 5 which remain in the upper portion of slot 9. This causes pins 7 to travel the arcuate path of arcuate groove 8 until the pins 7 come to a position just above the radial portion 8a. At this point the secondary back in slid linearly downwardly to move pin 5 to the bottom of slot 9 and move pins 7 to the bottom of radial portion 8a.

To reverse this operation and bring the secondary back 4 into its lowered position, the secondary back 4 is moved in the direction of the compound arrow 3 shown in FIG. 1. First it is lifted upwardly and then pivoted back and downwardly in a clockwise direction.

In its upright position, the secondary back forms a back rest for the child in the front of the Tandem Stroller. A child can sit in the back of the Tandem Stroller using the main back 14 as a seat. As shown in FIG. 3, main back 4 is provided for this purpose with whole openings 14a that are separated by a strap 14b which is sewn from the front ridge of a seat portion 14c to the back of the fabric covering secondary back 4. Main back 14 also includes an upright portion 14d that is covered with fabric and contains a board to act as a back rest for the child sitting in the rear of the Tandem Stroller.

With the secondary back 4 folded to its lowered position as shown in FIG. 2, seat portion 14c and leg openings 14a of the main back 14 are covered to form a continuous bed platform so that a single child can sleep in the stroller.

The child in the front seat of the stroller has the usual foot rest 13 which is pivotally mounted to the front frame member 34 and held in a variety of positions by a foot rest rod 13a.

To provide a footrest for the child sitting in the rear of the stroller, a basket 43 that is normally used as a storage space is positioned to receive the feet of the child sitting in the back. Even if the child cannot reach the basket, the basket acts as a guard to prevent the child from striking the ground, a possibly dangerous condition while the stroller is being pushed. Basket 43 is pivotally mounted to the lower end of second frame member 18. At this same location a support rod 45 extends rearwardly. When the stroller is completely folded, the support rod engages the ground and holds the folded stroller in an upright position in conjunction with the rear wheels 22.

Basket 43 is held at its front end by strap 47 which can be engaged to any portion of the frame, in this case the cross link 20.

As shown in FIG. 1, first and second links 61 and 62 are pivotally connected to each other. First link 61 is pivotally connected at an intermediate location on back member 15 and the second link 63 is pivotally connected to the first frame member 16, preferably at the same location as hook pin 83.

The first link 61 includes an upward extension which carries a hook 64 which hooks around the top of link 63. This prevents the links 61 and 63 from pivoting any further than the position shown in FIG. 1. When lifting the main back 14 into its upright position, 61 and 63 fold toward each other. The links are provided as supports to transfer some of the weight of the main back 14 up to the rest of the frame, particularly to the first frame member 16. This is necessary since there would be considerable weight of a child sitting on the main back 14.

While a specific embodiment of the invention has been shown and described in detail to illustrate the application of the principles of the invention, it will be understood that the invention may be embodied otherwise without departing from such principles.

What is claimed is:

1. A foldable Tandem Stroller comprising;

a frame assembly having a folded storage configuration and an unfolded use configuration;

a plurality of wheels connected to said frame assembly;

a front seat connected to said frame for seating a first child, said front seat having a rear edge;

a main back pivotally connected to said frame for movement between an upright position adjacent said rear edge of said front seat, and a substantially horizontal position adjacent said rear edge of said front seat, said main back forming a rear seat portion for seating a second child when said main back is in said substantially horizontal position, said rear seat portion having at least one leg opening for receiving the legs of the second child, said main back including an upright portion pivotally connected to the rear end of said rear seat portion and extending upwardly from said rear seat portion with said main back in its substantially horizontal position for supporting the back of a second child seated on said rear seat portion, wherein said upright portion is aligned with said main back when said main back is in said upright position;

a secondary back pivotally connected to said frame independently of said main back, said secondary back being pivotally mounted between an upright position adjacent to said rear edge of said front seat, and a substantially horizontal position adjacent said rear edge of said front seat, said secondary back overlying said main back while said secondary and main back are in their upright positions, said secondary back being movable to overlie said rear seat portion of said main back with said secondary and said main backs in their substantially horizontal positions to cover said at least one leg opening to form a sleeping platform with said front seat for a single child;

locking means for holding said secondary back in its upright position when said main back is in its substantially horizontal position to form a back rest for a first child seated in the front seat when said main back is in its substantially horizontal position; and further locking means for holding said main back in its upright position.

2. A stroller according to claim 1 wherein said rear seat portion is spaced rearwardly of the rear edge to form said at least one leg opening, and a leg strap connected to said rear seat portion to divide said at least one leg opening into two leg openings on either side of said leg strap.

3. A stroller according to claim 2 wherein said leg strap is connected to a rear surface of said secondary back.

4. A stroller according to claim 1 wherein said frame assembly includes a first frame member, a second frame member, a cross member pivotally connected to said first and second frame members at pivotal connections therewith said first, second and cross members being movable between an unfolded position with first and second members spaced from each other and with a portion of said cross member disposed adjacent a portion of said first member which is spaced from the pivotal connection between said first and cross members, and a folded position with said first and second members disposed adjacent means each other and said portions of said first and cross members spaced from each other, said cross member moving in a closing direction with movement from said unfolded to said folded position, latch means for holding said first second and cross members in their open position, and link means pivotally connected between the main back and said first frame member for at least partly supporting said main back on said first frame member when said main back is in its substantially horizontal position.

5. A stroller according to claim 4 including a basket having a rear portion pivotally connected to said second frame member and a front portion connected to said cross member, said basket being positioned below said at least one leg opening with said main back in its substantially horizontal position to form a foot rest for a second child seated in said rear seat portion.

6. A stroller according to claim 4 wherein said latch means comprises a first latch pivotally connected to one of said first and second frame members, first engagement means connected to the other of said first and second frame members and engaged with said first latch to hold said first, second and cross members in said unfolded position, said first latch being disengagable said from engagement means in said folded position, holding means for holding said first latch in a position out of engagement with said first engagement means, a second latch pivotally connected to one of said first and cross members on said portions thereof, second engagement means connected to the other of said first and cross members adjacent said portion thereof, said second engagement means being engaged with said second latch to hold said first, second, and cross members in said unfolded position, and disengaged from said second latch in said folded position.

7. A stroller according to claim 6 wherein said latch means further comprises first biasing means connected to said first latch for biasing said first latch into a position of engagement with said first engagement means, and second biasing means connected to said second latch for biasing said second latch into a position for engagement with said second engagement means.

* * * * *